United States Patent
Vinals et al.

(10) Patent No.: US 6,375,307 B1
(45) Date of Patent: Apr. 23, 2002

(54) PRINTING APPARATUS AND METHOD

(75) Inventors: Lluis Vinals, San Diego, CA (US); Salvador Sanchez, Barcelona (ES); Lawrence H White, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/505,469

(22) Filed: Feb. 16, 2000

(30) Foreign Application Priority Data

Feb. 17, 1999 (EP) .............................. 99301151

(51) Int. Cl.[7] .............................. B41J 2/145; B41J 2/15; B41J 29/38
(52) U.S. Cl. ........................................... 347/41; 347/16
(58) Field of Search .............................. 347/41, 20, 12, 347/14, 16; 358/1.8

(56) References Cited

U.S. PATENT DOCUMENTS

| | | | | |
|---|---|---|---|---|
| 5,929,876 A | * | 7/1999 | Bartolome | 347/20 |
| 6,039,438 A | * | 3/2000 | Beerling | 347/63 |
| 6,067,405 A | * | 5/2000 | Serra | 358/1.8 |

FOREIGN PATENT DOCUMENTS

| | | | |
|---|---|---|---|
| EP | 0 507 328 A2 | 4/1992 | ............. B41J/2/51 |
| EP | 0 517 543 A2 | 6/1992 | ............. B41J/2/205 |
| EP | 0 532 302 A2 | 9/1992 | ............... B41J/2/21 |
| EP | 0 645 246 A1 | 9/1994 | ............. B41J/2/205 |
| EP | 0761453 A1 | 9/1995 | ............... B41J/2/21 |
| EP | 0730973 A2 | 3/1996 | ............... B41J/2/51 |
| JP | 3-45351 | * 2/1991 | .................. 347/43 |

OTHER PUBLICATIONS

European Search Report dated Jul. 8, 1999, EP 99 30 1151, 3 pages.

* cited by examiner

*Primary Examiner*—Thinh Nguyen

(57) ABSTRACT

An inkjet printer prints swaths which overlap by, typically, one eighth of their width at each edge, each edge region having a reduced print density so that the combined density of the overlapping regions matches or exceeds that of non-overlapping regions. In a first embodiment, each edge region is printed with 50% printing density. In a second embodiment, the printing mask is modified so that each edge region comprises two sub-regions with differing print densities, e.g. a first outer sub-region with a printing density of 15% and a second sub-region with a printing density of 85%. In a third embodiment only one edge region has a reduced print density and comprises 3 sub-regions with different print densities, e.g. a first sub-region with a printing density of 6.75%, a second one with a printing density of 12.5% and a third one with a printing density of 25%.

19 Claims, 3 Drawing Sheets

PRINTING APPARATUS AND METHOD

The present invention relates to inkjet printers, including but not limited to large format printers, and to methods of operation thereof.

A problem with existing inkjet printheads, comprising a plurality of nozzles arranged substantially in a straight line, is that the nozzles at and adjacent the ends of the printhead or pen tend to eject inkdrops at an angle to a print medium rather than perpendicularly thereto as desired.

The Hewlett-Packard DesignJet 750 family of printers solved this problem by only using the central nozzles of the pen, thus avoiding the use of those with directionality problems. Since the extreme nozzles were not used at all, this produced clogging of these nozzles and deterioration of the reliability of the pen. In particular, since contaminants generally flow to the extreme nozzles actually being used, some of the central nozzles did not fire correctly. As the number of extreme nozzles with directionality problems increased, the portion of the pen actually being used had to become smaller and smaller to achieve satisfactory quality, which had an adverse effect on throughput.

European Patent Application no. EP 0 517 543, describes an inkjet recording method to control the unevenness of image density which is generated in the vicinity of a boundary between each recorded image area at each consecutive swath. This European Application is trying to address problems generated by form-feed advance accuracy and differences in drop volume (generating dot of different sizes) among extreme and central nozzles caused by manufacturing tolerances and heat distribution on nozzle plate. However it is not trying to solve problems generated by (i) swath height errors, i.e. nozzles firing at an angle which is different between central and extreme nozzles, or (ii) nozzle health, since the extreme nozzles are more sensitive to internal contamination, these are more likely to become clogged, misdirected or weak.

This helps to reduce the difference in optical density between a zone printed at 100% printing density in one pass and a zone printed at 100% printing density in two or more passes, irrespective of the distribution of the drops during the two or more passes. In particular dots made on the second pass are not printed in the position that would be desired for a maximum image quality, since this misalignment may produce wide lighter areas in the interswath regions.

Another previously-proposed solution was to print in two-pass mode throughout, but this produced essentially a doubling of printing time, which was not generally acceptable.

The present invention seeks to overcome or reduce one or more of the above-mentioned problems.

According to a first aspect of the present invention there is an inkjet printing apparatus having a printhead comprising a plurality of nozzles arranged along a printhead axis, the printing apparatus being arranged to print swaths which overlap the neighbouring swaths by a fraction of the swath width, characterised in that only one edge region of each swath which overlaps the neighbouring swaths has a reduced print density relative to its remaining regions.

Accordingly, this apparatus having only one edge region with a reduced print density may increase the throughput of the printhead.

According to a second aspect of the present invention, there is provided an inkjet printing apparatus having a printhead comprising a plurality of nozzles arranged along a printhead axis, the printing apparatus being arranged to print swaths which overlap the neighbouring swaths by a fraction of the swath width, the edge regions of each swath which overlap the neighbouring swaths have a reduced print density relative to their central regions said overlapping fraction at each edge characterised by lying in the range between one sixteenth and one quarter of the swath width.

Advantageously, this accurate selection of the overlapping region helps the apparatus improving the image quality of the printed image, by balancing the need of having a big overlapping region, which can make more pleasant to the eye the transition between the portion of the image printed in a one pass and the portion printed in a two pass, and a small overlapping region, which increase the throughput of the printhead.

According to a third aspect of the present invention, there is provided a method of operating an inkjet printing apparatus having a printhead comprising a plurality of nozzles arranged substantially along a printhead axis comprising the steps of printing swaths which overlap the neighbouring swaths by a fraction of the swath width, so that the combined density of the overlapping regions exceeds that of non-overlapping regions.

Preferred embodiments of the present invention will now be described, by way of example only, with reference to the accompanying drawings, of which:

Figure 1:
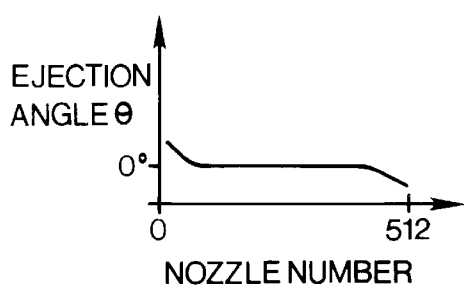
FIG. 1 is a graph showing a typical profile of angle of inkdrop ejection against nozzle position.

Referring to the drawings, FIG. 1 shows a typical directionality profile of inkjet printheads with nozzles arranged along the pen axis. As shown, the profile is a curve which is generally planar in a central region but variable at the ends. In fact the curve often displays much more localised variations than those shown.

Figure 2:
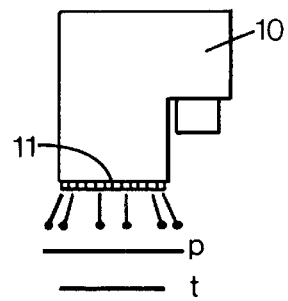
FIG. 2 is a schematic diagram of an inkjet printhead to assist in the explanation of FIG. 1.

Such profiles produce an effect named Swath Height Error, which will now be explained in connection with FIG. 2. Swath Height Error arises when the height of the printhead (i.e. the dimension along its axis) is not equal to the height of the area actually printed. FIG. 2 shows how a discrepancy arises between the printed swath height "p" and the theoretical swath height "t". The 512 nozzles 11 of printhead 10 are shown as having the profile of FIG. 1 so that the extreme nozzles eject ink in a direction away from the central nozzles, resulting in "p" being greater than "t".

Figure 3A:
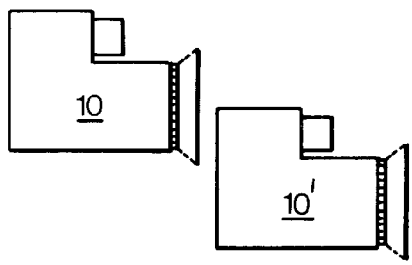
FIGS. 3a and 3b illustrate the effects of positive and negative swath height error in prior art printing devices.
Figure 3A:
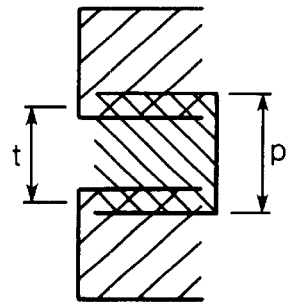
Figure 3B:
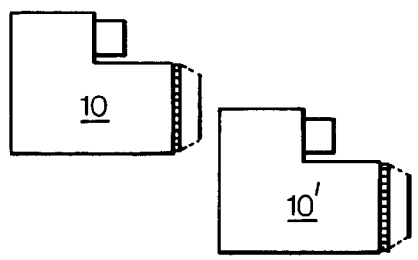
Figure 3B:
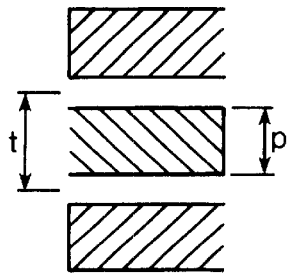

When printing in one pass, the advance of the medium is equal to the theoretical swath height, producing overlapping of printed areas (positive SHE, see FIG. 3a) or white streaks (negative SHE, see FIG. 3b). FIGS. 3a and 3b show the printed output of a printhead in adjacent positions 10, 10' with FIG. 3b illustrating the result of the extreme nozzles directing ink in a direction towards the central nozzles, resulting in "p" being less than "t".

It is not practical to adjust the height of the printed swath, i.e. the unit of printing medium advance, to cater for those defects. Furthermore, the above-mentioned previous proposals have the disadvantage of substantially reducing throughput.

Figure 4:
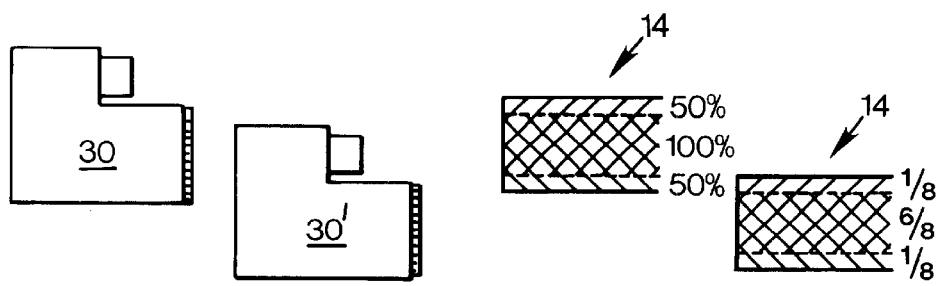
FIG. 4 shows a schematic diagram of an arrangement in accordance with a first embodiment of the present invention.

FIG. 4 illustrates an arrangement in accordance with a first embodiment of the present invention in which at neighbouring positions 30, 30' the printhead is arranged to print swaths 14 with the outputs of their adjacent extreme nozzles overlapping by one eighth of the swath height. Moreover the so-called print masks of the printheads are arranged so that their overlapping extreme nozzles print with a 50% printing density, i.e. simulating a two-pass printing mode, whereas their central nozzles print at 100% as if there was a purely one-pass printing mode. It will be seen that the central nozzles extend over a height corresponding to six-eighths of the swath height. It will also be noted that the advance of the print medium is slightly reduced to seven-eighths of that of the described prior art arrangement.

The above-described arrangement has numerous advantages. For example, by interlacing the passes of the printheads, errors produced by misdirection of ink drops are no longer visible. It still has a relatively fast print mode; the corresponding advance of an arrangement in which, say, the end eighths were completely unused, would be six-eighths, and that of a completely two-pass arrangement would be only four-eighths. The end nozzles of the above-described arrangement are still in continuous use so that contaminants do not move towards the central nozzles.

Various modifications can be made to the above-described arrangement. For example, the numbers given may be changed to suit the particular application. Thus the printhead 30 may have any number of nozzles different from 512. Also the fraction of the overlapping nozzles may vary from just above 0 to approaching one half, with the preferred range lying between one sixteenth and one quarter.

Moreover, steps may be taken to hide any errors produced by contaminants in the extreme nozzles. For example, if it is established that the nth nozzle from the bottom of printhead 30 is blocked, then compensation can be arranged in that the nth nozzle upwards from the top of the central region of the printhead prints at 100% print density.

Figure 5:
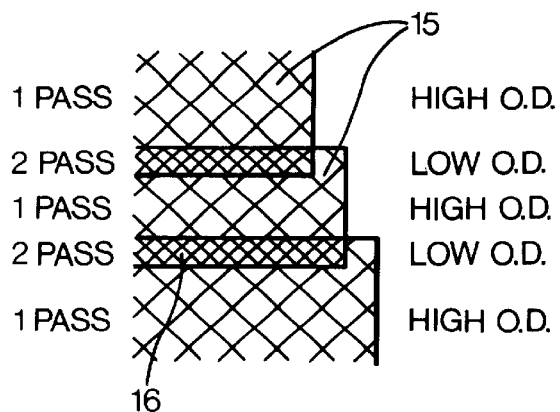
FIG. 5 illustrates a problem which can still occur with an arrangement in accordance with FIG. 4.

A second embodiment of the present invention is based on the recognition that problems may arise in the operation of the embodiment of FIG. 4. It should be noted that there is commonly a difference in optical density between a zone printed in one-pass mode and a zone printed in two-pass mode, even with the same amount of ink on the paper. This is due to ink interacting differently with the print medium when the second ink application occurs when the other ink has dried. The banding effect produced is illustrated in FIG. 5 which shows central regions 15 forming areas with a high optical density and the overlapping extreme regions 16 forming zones with a low optical density.

Figure 6:
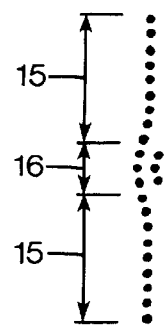
FIG. 6 illustrates a separate problem which can still occur with an arrangement in accordance with FIG. 4.

Another problem that may occur is caused by the nozzles at the bottom of the printhead (which produce the first printing in an extreme region) being misaligned with the nozzles at the top of the printhead (which produce the second printing in the extreme region). Such misalignment is more likely to occur in such cases than between adjacent groups of nozzles. Because substantially equal amounts of ink are supplied by each extreme nozzle group, the effects of any slight misalignment become noticeable in extreme regions 16, as shown schematically in FIG. 6.

Figure 7:
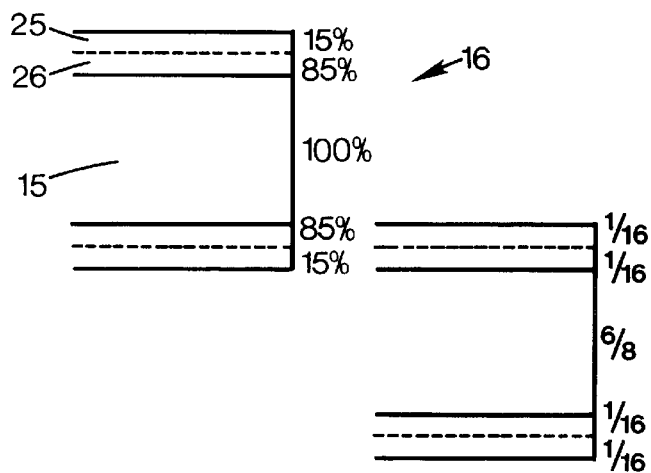
FIG. 7 illustrates a schematic diagram similar to FIG. 4 but of an arrangement in accordance with a second embodiment of the present invention.

FIG. 7 illustrates an arrangement in accordance with the second embodiment of the present invention in which, for each pass of the extreme regions 16 of the printing mask, there are used non-uniform distributions of ink density. In particular the nozzles of the extreme one sixteenth region 25 of each printhead are printed with only 15% printing density, with the next one sixteenth region 26 being printed at 85% printing density.

Figure 8:
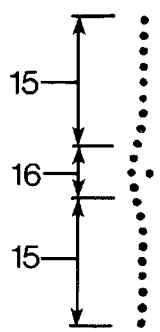
FIG. 8 is a diagram corresponding to FIG. 6, but illustrating the output of an arrangement in accordance with FIG. 7.

Such an arrangement succeeds in still hiding errors without causing too much banding. This is because most of the ink is put on the paper on the same pass, this being less noticeable than the optical density difference due to placing ink in two substantially similar passes. The arrangement is particularly advantageous for line drawings, e.g. CAD drawings, but less so for graphics images. FIG. 8 illustrates that the effects of extreme nozzle misalignment are much less noticeable when only 15% of the dots come from the other pass.

A normal mono mode use of the above arrangements involves only an extra 5 seconds in producing a D size plot (i.e. substantially 47 seconds compared to 42 seconds).

The same modifications may be made to the second embodiment as to the first embodiment. Moreover, the values of the various numbers may be changed. The two density value pairs chosen may vary between 1% and 99% to 49% and 51%, with preferred pairs varying between 5% and 95% to 45% and 55%. Most preferred pairs are the 15% and 85% (as described) and 10% and 90%, and other pairs lying therebetween.

Also the two regions 25, 26 do not need to be of the same extent; they could each occupy 10 to 90% of the combined extreme region.

The edge strip of lower printing density could be located nearer the central nozzles than the adjacent strip of higher printing density, but such an arrangement would be less advantageous since it would place more reliance on nozzles which were more likely to be faulty.

Instead of two edge strips, three or more edge strips of differing print density may be employed.

A third embodiment of the present invention is based on the recognition that problems may still arise in the operation of embodiment of FIG. 7. It should be noted that there is commonly a difference in optical density between a zone printed at 100% printing density in one pass and a zone printed at 100% printing density in two or more passes, irrespective of the distribution of the drops during the two or more passes. In particular dots made on the second pass are not printed in the position that would be desired for a maximum image quality. Several physical phenomena related to inkjet technology, printer mechanics and media chemistry are involved. Bi-directional errors, scan axis correction errors, paper advance errors and especially media expansion that occurs during the printing of the first pass, all work to ensure that the dot placed on the second pass may be poorly aligned to dots printed on the first pass. This misalignment may produce wide lighter areas in the inter-swath regions.

Figure 9:
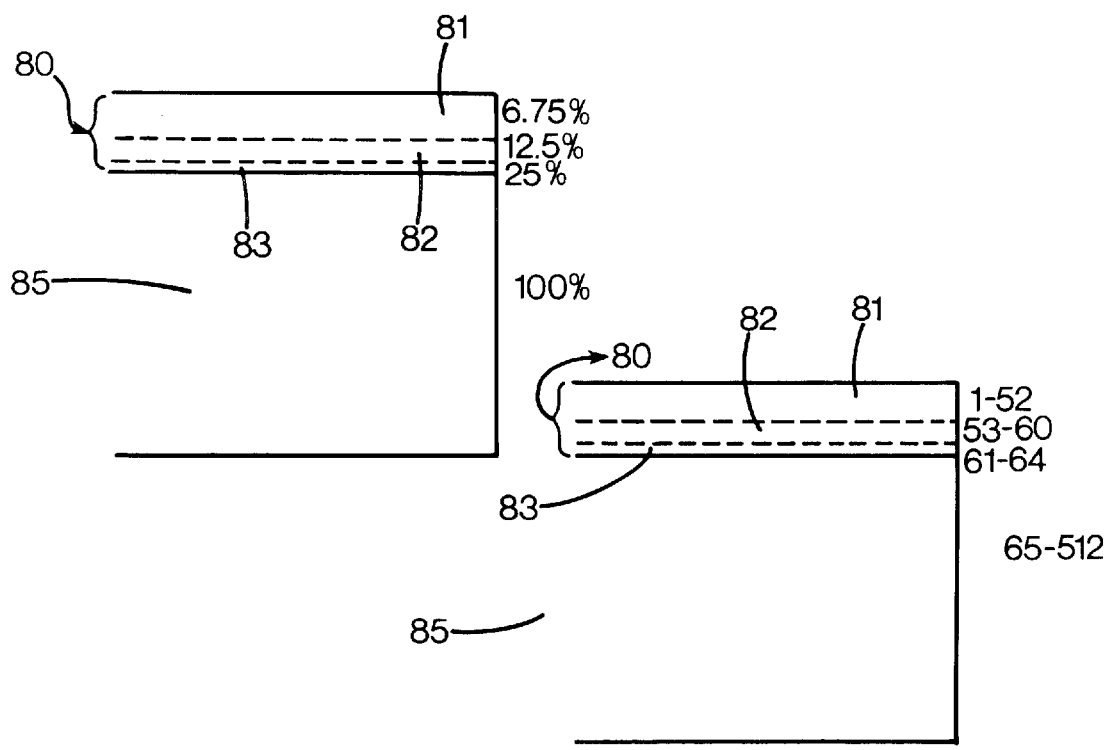
FIG. 9 illustrates a schematic diagram similar to FIG. 7 but of an arrangement in accordance with a third embodiment of the present invention.

FIG. 9 illustrates another arrangement in accordance with the third embodiment of the present invention in which, for each pass of the extreme region 80 of the printing mask, there are used non-uniform distributions of ink density.

According to the present example, the bottom 448 nozzles (from nozzle no. 65 to nozzle no. 512) of a 512-nozzles printhead are fired in the current pass whenever there is print data. This means that all of the print data is printed in a single pass with these 448 nozzles, i.e. the nozzles are printing at 100% printing density using the region 85 of the printing mask. Then the swath advance is only 448 dot rows. Top nozzles 1 to 64 are used to over print the completed swath in order to mask any white space, or lighter areas, leftover from the swath advance.

Since nozzles 1–64 are overprinting an image already entirely formed, these may print at a low printing density, preferably lower than 10%, e.g. 6.75%. However the sharp change in the printing density, i.e. from 6.75% (even if printed over a 100% printed area) to 100%, may generate some banding as well. Due to this reason nozzles 1 to 64 has been preferably divided into groups, each group being masked differently to generate a smoother transition of the printing density. Advantageously as the printing frequency is increased between groups, the number of nozzles contained in each group is correspondingly reduced.

Preferably, nozzles 1 to 64 of top region of the printhead are divided into 3 groups, the first group containing about 85% (±3%) of the nozzles in the top region, the second one containing about 10% (±3%) of the nozzles, and the third one containing about 5% (±3%) of the nozzles. More preferably, in the first group nozzles 1 to 52, masked by a first sub-region 81 of the printing mask, fire at 6.75% of density. In the second group, nozzles 53 to 60, masked by a second sub-region 82, fire at 12.5% of density; while in the third group, nozzles 61 to 64, masked by a third sub-region 83, print at 25% of density. Nozzles 1 to 64 are fired concurrently during the same pass with nozzles from 65 to 512, in accordance with the data to be printed.

Depending on the constraint of the printhead the number of nozzles in the top region can be varied between the total number of nozzles divided by two less 1 (in this example 255) and 10, always maintaining a division into groups to generate a smoother transition between the low printing density of the overprint nozzles and the 100% printing density of the remaining nozzles. More preferably the top region will contains from 85 to 50 nozzles or less. Clearly, a reduction in the number of nozzles within the top region will cause a corresponding increase of the swath advance or vice versa.

This print mode has been capable to eliminate the wide area banding produced by the interlace printmode while simultaneously reducing the white space banding. However area fills made with this printmode do exhibit a slightly darker area in the overlap region, but this feature has been proven to be more acceptable to the eye than the wide area light regions described above. Moreover this third embodiment as the previous ones, by printing on the same area with both the top and the bottom extreme regions of the printhead, may be advantageously used to hide errors caused by failing, misdirected or weak nozzles located in one of the two extreme regions of the pen.

In a further embodiment of the present invention, the print mode is arranged as to allow to place more than 100% of the required ink on the overlap region in two passes, but data dots are printed on each pass as well as extra overprinted dots.

The arrangements according to the present invention are preferably applied to black ink. However, they may additionally or alternatively be used for colour printheads.

It will be noted that the present invention provides a printing apparatus and method in which a partial two-pass print mode hides end nozzle defects whilst being almost as fast as a single-pass print mode.

What is claimed is:

1. An inkjet printing apparatus having a printhead comprising a plurality of nozzles arranged along a printhead axis, the printing apparatus being arranged to print swaths which overlap the neighbouring swaths by a fraction of the swath width, wherein only one edge region of each swath which overlaps the neighbouring swaths has a reduced print density relative to the remaining regions.

2. A printing apparatus according to claim 1, wherein the overlapping fraction at each edge lies in the range between one sixteenth and one quarter of the swath width.

3. A printing apparatus according to claim 1, wherein the reduced print density at the edge region is applied to overprint an area already printed at 100% print density by the remaining regions.

4. A printing apparatus according to claim 1, wherein the edge region or regions are each divided into at least two sub-regions of differing print densities.

5. A printing apparatus according to claim 4, wherein the printing density in the edge sub-region is in the range 5 to 15%.

6. A printing apparatus according to claim 5 wherein the printing density in the two consecutively adjacent sub-regions is in the range of 10 to 20% and 20 to 30%.

7. A printing apparatus according to claim 1 wherein the edge region is divided into at least two sub-regions of differing print densities, one of the sub-regions printing at a lower print density receiving ink from an higher number of nozzles than another of the sub-regions.

8. A printing apparatus according to claim 1, wherein the printing apparatus prints in black ink.

9. A printing apparatus according to claim 1, having an at least one failing nozzle in an edge region thereof, wherein the printing density of a corresponding nozzle in the other edge region, which prints along the same path in the adjacent scan, is arranged to print for compensating the at least one failing nozzle.

10. A printing apparatus according to claim 1, wherein the sum of the printing density in two adjacent edge regions, which are printed along the same path in two adjacent scans, is more than 100%.

11. An inkjet printing apparatus having a printhead comprising a plurality of nozzles arranged along a printhead axis, the printing apparatus being arranged to print swaths which overlap the neighbouring swaths by a fraction of the swath width, only one edge region of each swath which overlaps the neighbouring swaths having a reduced print density relative to a swath central region, wherein said overlapping fraction at each edge is in the range between one sixteenth and one quarter of the swath width, and the combined density of the overlapping regions exceeds that of the central region.

12. A printing apparatus according to claim 11, wherein the overlapping fraction is substantially one eighth of the swath width.

13. A printing apparatus according to claim 11, wherein the edge region or regions are each divided into at least two sub-regions of differing print densities.

14. A printing apparatus according to claim 13, wherein the printing density in the edge sub-region is in the range 5 to 15%.

15. A printing apparatus according to claim 14 wherein the printing density in the adjacent sub-region is in the range 95 to 85%.

16. A printing apparatus according to claim 13 wherein each of the sub-regions occupy substantially one sixteenth of the swath width.

17. A printing apparatus according to claim 11, wherein the printing apparatus prints in black ink.

18. A printing apparatus according to claim 11, having an at least one failing nozzle in an edge region thereof, wherein the printing density of a corresponding nozzle in the other edge region, which prints along the same path in the adjacent scan, is arranged to print for compensating the at least one failing nozzle.

19. A method of operating an inkjet printing apparatus having a printhead comprising a plurality of nozzles arranged subsequently along a printhead axis comprising the steps of printing swaths which overlap the neighboring swaths by a fraction of the swath width, so that the combined density of the overlapping regions exceeds that of non-overlapping regions, wherein said step of printing swaths includes the step of printing only one edge region of each swath which overlaps the neighboring swaths at a reduced print density relative to the printing density of remaining regions of said each swath.

* * * * *